C. H. SELLERS.
NUT LOCK.
APPLICATION FILED NOV. 11, 1914.
1,154,813.
Patented Sept. 28, 1915.
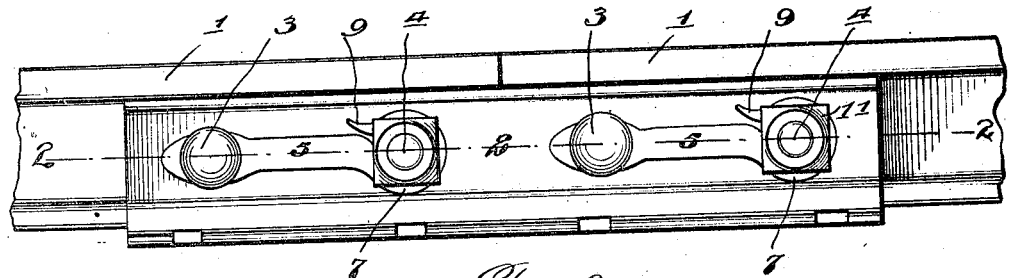
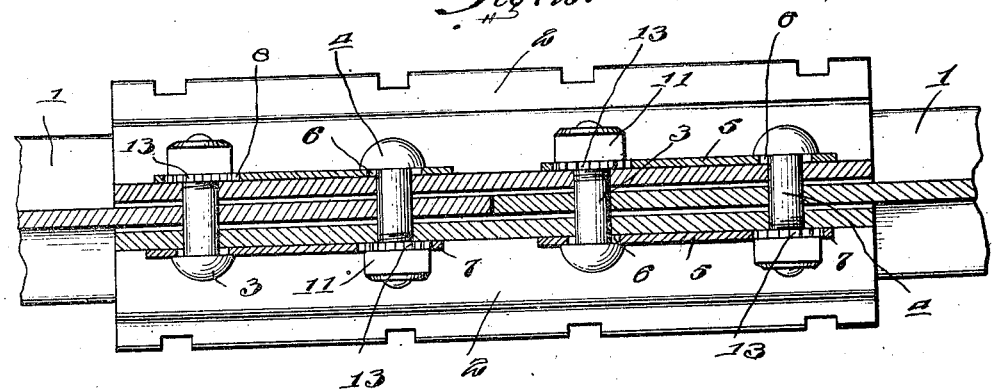
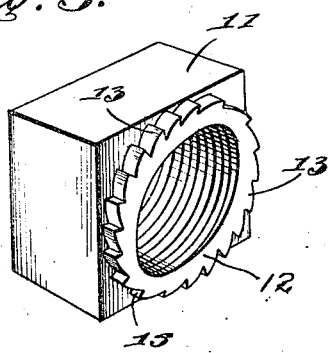
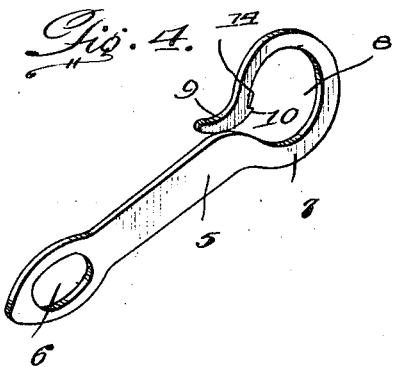
Inventor
C. H. Sellers
Witnesses
Frederick L. Fox.
By Victor J. Evans
Attorney

UNITED STATES PATENT OFFICE.

CHARLES H. SELLERS, OF EUGENE, OREGON.

NUT-LOCK.

1,154,813.   Specification of Letters Patent.   Patented Sept. 28, 1915.

Application filed November 11, 1914.   Serial No. 871,550.

*To all whom it may concern:*

Be it known that I, CHARLES H. SELLERS, a citizen of the United States, residing at Eugene, in the county of Lane and State of Oregon, have invented new and useful Improvements in Nut-Locks, of which the following is a specification.

This invention relates to nut locks, primarily intended for locking the nuts to the connecting bolts of fish plates, but of course, is susceptible for other uses, and the primary object of the invention is to provide a nut having its inner face formed with a round extension having peripheral teeth and to provide a flat spring bar having both of its ends formed with openings one for the reception of the headed end of one of the bolts which pass through the joint and the second to receive the toothed member upon the nut, the said second end having integrally formed therewith a spring pawl which engages with one of the teeth of the nut, while extending from the pawl is a finger member which normally contacts with one of the edges of the plate, and which has its end disposed a suitable distance beyond the plate so that an instrument may be inserted between the said finger and the edge of the plate with which it contacts to bring the pawl out of engagement with the teeth of the nut and so remove the nut from the bolt without destroying the locking means.

With the above and other objects in view, the improvement resides in the construction, combination and arrangement of parts set forth in the following specification and falling within the scope of the appended claim.

In the drawing: Figure 1 is a side elevation illustrating a rail joint having its nuts locked in accordance with the present invention, Fig. 2 is a detail horizontal sectional view through the same approximately on the line 2—2 of Fig. 1, Fig. 3 is a perspective view looking toward the inner face of the nut, and Fig. 4 is a perspective view of the nut locking member.

Referring now to the drawings in detail, 1—1 designate two rails which are joined by the usual fish plates 2, bolts 3 and 4 being passed in opposite directions through the fish plates and through the webs of the rails. The numeral 5 designates a spring plate which has one of its ends provided with an elongated opening 6 which is arranged upon the shank of the bolt 3 and is contacted by the head thereof. The second end of the flat spring plate 5 is enlarged and rounded, as at 7. The said enlarged end is centrally provided with a round opening 8 so that the metal between the opening and the outer periphery of the head 7 is of a greatly less width than that of the body as well as that of the first mentioned end of said plate which is formed with the opening 6. The round head 7 is slit in a line with one of the longitudinal edges of the plate 5 and is formed with an outwardly extending arcuate finger 9, the inner edge of said finger being enlarged and offset to form a ratchet tooth 10, while the said finger normally contacts with the edge of the body of the plate 5 as clearly shown in Fig. 4 of the drawing. The finger extends angularly of the edge of the plate with which it contacts for a suitable distance, so that an instrument may be inserted between the inner edge of the finger and the edge of the plate with which the said finger contacts to draw the toothed portion or pawl 10 outwardly for a purpose which will presently be described. The numeral 11 designates the nuts for the bolts 3 and 4. Each of these nuts has its inner face provided with an integral projecting circular member or disk 12 and each of the annular projections is formed with peripheral teeth 13. The annular projections 12 are of a size sufficient to be received within the round opening 8 of the head 7 and the pawl 10 is adapted to contact between two of the teeth 13 to prevent the rotation of the nut in an unscrewing direction. The tooth 10 comprises an angular member which terminates in a straight shoulder 14, the teeth of the angular projections 12 also comprising angular members terminating in substantially straight shoulders as illustrated in the drawing.

The device, it will be noted, not only serves as a locking means for one of the bolts but also by providing one of the ends thereof with elongated openings 6, serves as a washer for the bolts 3, and, as stated, when it is desired to separate the nuts from the bolts, a suitable instrument is inserted between the rounded edge of the finger 9 and the rounded edge of the body portion of the plate 5 to spring the toothed member or pawl 10 out of engagement with the teeth of a nut.

From the above description, taken in connection with the accompanying drawing, the simplicity of the device, as well as the advantage thereof will, it is thought, be perfectly apparent to those skilled in the art to which such invention appertains without further detailed description.

Having thus described the invention, what I claim is:

The combination with a rail joint having bolts and nuts for securing the fish plates to the rails, and said nuts having annular projections provided with peripheral teeth, of a spring plate having an opening through which one of the bolts pass, the opposite end of the plate being enlarged and provided with a round opening, to receive the annular tooth projection of the nut for the adjacent bolt, the said head being split in a line with one of the longitudinal edges, and the said split portion extended outwardly to provide an arcuate finger, and the inner end of the said finger being enlarged to provide the finger with a tooth which is adapted to co-act with one of the teeth of the annular projection of the nut.

In testimony whereof I affix my signature in presence of two witnesses.

CHARLES H. SELLERS.

Witnesses:
 WHITTEN SWOFFORD,
 LOYALL RUGH.